(12) United States Patent
Branke et al.

(10) Patent No.: US 7,444,309 B2
(45) Date of Patent: Oct. 28, 2008

(54) METHOD AND SYSTEM FOR IMPLEMENTING EVOLUTIONARY ALGORITHMS

(75) Inventors: Juergen Branke, Karlsruhe (DE); Michael Campos, Los Angeles, CA (US)

(73) Assignee: Icosystem Corporation, Cambridge, MA (US)

( * ) Notice: Subject to any disclaimer, the term of this patent is extended or adjusted under 35 U.S.C. 154(b) by 0 days.

(21) Appl. No.: 10/489,648

(22) PCT Filed: Oct. 28, 2002

(86) PCT No.: PCT/US02/34571

§ 371 (c)(1), (2), (4) Date: Jun. 7, 2004

(87) PCT Pub. No.: WO03/038749

PCT Pub. Date: May 8, 2003

(65) Prior Publication Data

US 2004/0210545 A1 Oct. 21, 2004

Related U.S. Application Data

(60) Provisional application No. 60/335,654, filed on Oct. 31, 2001.

(51) Int. Cl.
*G06N 3/12* (2006.01)
(52) U.S. Cl. .......................... 706/13; 706/19
(58) Field of Classification Search .............. 706/12–16, 706/19
See application file for complete search history.

(56) References Cited

U.S. PATENT DOCUMENTS

| 4,796,194 | A |   | 1/1989  | Atherton        |        |
|-----------|---|---|---------|-----------------|--------|
| 4,935,877 | A | * | 6/1990  | Koza            | 706/13 |
| 5,136,686 | A | * | 8/1992  | Koza            | 706/13 |
| 5,148,513 | A | * | 9/1992  | Koza et al.     | 706/13 |
| 5,195,172 | A |   | 3/1993  | Elad et al.     |        |
| 5,233,513 | A |   | 8/1993  | Doyle           |        |
| 5,428,712 | A |   | 6/1995  | Elad et al.     |        |
| 5,465,221 | A |   | 11/1995 | Merat et al.    |        |
| 5,568,590 | A |   | 10/1996 | Tolson          |        |
| 5,581,657 | A |   | 12/1996 | Lyon            |        |
| 5,617,510 | A |   | 4/1997  | Keyrouz et al.  |        |
| 5,708,774 | A |   | 1/1998  | Boden           |        |

(Continued)

FOREIGN PATENT DOCUMENTS

EP 1235180 8/2002

(Continued)

OTHER PUBLICATIONS http://dictionary.reference.com; "contiguous".*

(Continued)

*Primary Examiner*—David Vincent
*Assistant Examiner*—Omar F Fernandez Rivas
(74) *Attorney, Agent, or Firm*—Stephen B. Deutsch; Foley Hoag LLP (57) ABSTRACT

A method, computer program storage medium and system that implement evolutionary algorithms on heterogeneous computers; in which a central process resident in a central computer delegates subpopulations of individuals of similar fitness from a central pool to separate processes resident on peripheral computers where they evolve for a certain number of generations after which they return to the central pool before the delegation is repeated.

50 Claims, 4 Drawing Sheets

U.S. PATENT DOCUMENTS

| | | | |
|---|---|---|---|
| 5,737,581 A | 4/1998 | Keane | |
| 5,761,381 A * | 6/1998 | Arci et al. | 706/13 |
| 5,761,494 A | 6/1998 | Smedley et al. | |
| 5,793,931 A | 8/1998 | Hillis | |
| 5,809,489 A | 9/1998 | Davidor et al. | |
| 5,858,462 A | 1/1999 | Yamazaki et al. | |
| 5,864,633 A | 1/1999 | Opsal et al. | |
| 5,867,397 A | 2/1999 | Koza et al. | |
| 5,890,133 A | 3/1999 | Ernst et al. | |
| 5,890,146 A | 3/1999 | Wavish et al. | |
| 5,897,629 A | 4/1999 | Shinagawa et al. | |
| 5,930,780 A * | 7/1999 | Hughes et al. | 706/13 |
| 5,963,447 A | 10/1999 | Kohn et al. | |
| 5,963,939 A | 10/1999 | McCann et al. | |
| 5,970,487 A * | 10/1999 | Shackleford et al. | 707/6 |
| 5,987,457 A | 11/1999 | Ballard | |
| 6,029,139 A | 2/2000 | Cunningham et al. | |
| 6,055,523 A | 4/2000 | Hillis | |
| 6,098,059 A * | 8/2000 | Nordin | 706/13 |
| 6,125,351 A | 9/2000 | Kauffman | |
| 6,236,955 B1 | 5/2001 | Summers | |
| 6,253,200 B1 | 6/2001 | Smedley et al. | |
| 6,321,205 B1 | 11/2001 | Eder | |
| 6,327,582 B1 * | 12/2001 | Worzel | 706/13 |
| 6,336,110 B1 | 1/2002 | Tamura et al. | |
| 6,408,263 B1 | 6/2002 | Summers | |
| 6,411,373 B1 | 6/2002 | Garside et al. | |
| 6,424,358 B1 | 7/2002 | DiDomizio et al. | |
| 6,430,545 B1 | 8/2002 | Honarvar et al. | |
| 6,434,435 B1 | 8/2002 | Tubel et al. | |
| 6,434,542 B1 | 8/2002 | Farmen et al. | |
| 6,449,761 B1 | 9/2002 | Greidinger et al. | |
| 6,480,832 B2 | 11/2002 | Nakisa et al. | |
| 6,513,024 B1 | 1/2003 | Li | |
| 6,523,016 B1 | 2/2003 | Michalski | |
| 6,528,715 B1 | 3/2003 | Gargi | |
| 6,571,282 B1 | 5/2003 | Bowman-Amuah | |
| 6,576,919 B1 | 6/2003 | Yoshida et al. | |
| 6,709,330 B1 | 3/2004 | Klein et al. | |
| 6,745,184 B1 | 6/2004 | Choi et al. | |
| 6,760,335 B1 | 7/2004 | Andersson et al. | |
| 6,763,354 B2 | 7/2004 | Hosken et al. | |
| 6,848,104 B1 | 1/2005 | Van Ee et al. | |
| 6,865,571 B2 | 3/2005 | Inaba et al. | |
| 6,895,286 B2 * | 5/2005 | Kaji et al. | 700/28 |
| 6,895,405 B1 | 5/2005 | Choi et al. | |
| 6,912,587 B1 | 6/2005 | O'Neil | |
| 6,928,434 B1 | 8/2005 | Choi et al. | |
| 6,934,405 B1 | 8/2005 | Schuessler et al. | |
| 6,941,287 B1 * | 9/2005 | Vaidyanathan et al. | 706/12 |
| 6,947,930 B2 | 9/2005 | Anick et al. | |
| 6,950,270 B2 | 9/2005 | Lyle et al. | |
| 6,950,712 B2 | 9/2005 | Ulyanov et al. | |
| 6,952,700 B2 | 10/2005 | Modha et al. | |
| 6,957,200 B2 | 10/2005 | Buczak et al. | |
| 6,996,560 B1 | 2/2006 | Choi et al. | |
| 7,000,700 B2 | 2/2006 | Cairns et al. | |
| 7,003,504 B1 | 2/2006 | Angus et al. | |
| 7,007,006 B2 | 2/2006 | Zilio et al. | |
| 7,035,740 B2 | 4/2006 | Kermani | |
| 7,070,647 B2 | 7/2006 | Fujimori et al. | |
| 7,076,475 B2 | 7/2006 | Honarvar | |
| 7,117,202 B1 | 10/2006 | Willoughby | |
| 7,127,695 B2 | 10/2006 | Huang et al. | |
| 7,190,116 B2 | 3/2007 | Kobayashi et al. | |
| 7,191,164 B2 | 3/2007 | Ray et al. | |
| 7,280,986 B2 | 10/2007 | Goldberg et al. | |
| 2001/0003824 A1 | 6/2001 | Schnier | |
| 2002/0156773 A1 | 10/2002 | Hildebrand et al. | |
| 2003/0055614 A1 | 3/2003 | Pelikan et al. | |
| 2003/0088458 A1 | 5/2003 | Afeyan et al. | |
| 2004/0117355 A1 | 6/2004 | Lef et al. | |
| 2004/0133355 A1 | 7/2004 | Schneider | |
| 2004/0162738 A1 | 8/2004 | Sanders et al. | |
| 2004/0204957 A1 | 10/2004 | Afeyan et al. | |

FOREIGN PATENT DOCUMENTS

| | | |
|---|---|---|
| WO | WO-00/02136 | 1/2000 |
| WO | WO-00/02138 | 1/2000 |
| WO | WO 00/54185 | 9/2000 |
| WO | WO-02/27541 | 4/2002 |

OTHER PUBLICATIONS

Buchsbaum, D. et al "Designing Collective Behavior in a Group of Humans Using a Real-Time Polling System and Interactive Evolution", Swarm Intelligence Symposium, 2005. SIS 2005. Proceedings 2005 IEEE Jun. 8-10, 2005, Publication pp. 15-21 (Our pp. 1-13).

Trifonov, I., et al "Resource Allocation for a Distributed Sensor Network", Swarm Intelligence Symposium, 2005. SIS 2005. Proceedings 2005 IEEE Jun. 8-10, 2005 Publication pp. 428-431 (Our pp. 1-4).

Gaudiano, P. et al "Evolving Behaviors for a Swarm of Unmanned Air Vehicles", Swarm Intelligence Symposium, 2005. SIS 2005. Proceedings 2005 IEEE Jun. 8-10, 2005 Publication pp. 317-324 (Our pp. 1-6, 13,14).

Anderson, C., et al "Modeling, Quantifying and Testing Complex Aggregate Service Chains", Web Services, 2005. ICWS 2005. Proceedings. 2005 IEEE International Conference on Jul. 11-15, 2005 Publication pp. 274-281 vol. 1 (Our pp. 1-8).

Funes, P., et al., "Interactive Multi-Participant Tour Allocation", Evolutionary Computation, 2004. CEC2004. Congress on vol. 2, Jun. 19-23, 2004 pp. 1699-1705 vol. 2.

Malinchik, S., "Interactive Exploratory Data Analysis", Evolutionary Computation, 2004. CEC2004. Congress on vol. 1, Jun. 19-23, 2004 pp. 1098-1104 vol. 1.

Anderson, C., et al., "Evolutionary Testing as Both a Testing and Redesign Tool: a Study of a Shipboard Firemain's Valve and Pump Controls", Evolution Computation, 2004. CEC2004. Congress on vol. 1, Jun. 19-23, 2004 pp. 1089-1097 vol. 1.

Ashburn, T., et al., "Interactive Inversion of Financial Markets Agent-Based Models", Evolutionary Computation, 2004. CEC 2004. Congress on vol. 1, Jun. 19-23, 2004 pp. 522-529 vol. 1.

Pollack, J., et al., "Coevolutionary Robotics" Evolvable Hardware, 1999. Proceedings of the First NASA/DoD Workshop on Jul. 19-21, 1999 pp. 208-216.

Kumar, R., et al., "Assessing the Convergence of Rank-Based Multiobjective Genetic Algorithms", Genetic Algorithms in Engineering Systems: Innovations And Applications, 1997. GALESIA 97. Second International Conference on (Conf. Publ. No. 446) Sep. 2-4, 1997 pp. 19-23.

Van Der Meche, E., "Nevanlinna-Pick Interpolation with Degree Constraint: Complete Parameterization Based on Lyapunov Inequalities", Decision and Control, 2004. CDC. 43rd IEEE Conference on vol. 1, Dec. 14-17, 2004 pp. 411-416 vol. 1

Kaltofen, E., et al., "Processor-Efficient Parallel Solution of Linear Systems. II. The Positive Characteristic and Singular Cases" Foundations of Computer Science, 1992. Proceedings., 33rd Annual Symposium on Oct. 24-27, 1992 pp. 714-723.

De Moor, B., et al., "A Geometrical Approach to the Maximal Corank Problems in the Analysis of Linear Relations", Decision and Control, 1986 25th IEEE Conference on vol. 25, Part 1, Dec. 1986 pp. 1990-1995.

Linkens, D.A., et al. "A Distributed Genetic Algorithm for Multivariable Fuzzy Control", Genetic Algorithms for Control Systems Engineering, IEEE Colloquium on May 28, 1993 pp. 9/1-9/3.

Sakawa, M., et al., "An Interactive Fuzzy Satisficing Method for Multiobjective Nonconvex Programming Problems With Fuzzy Numbers Through Coevolutionary Genetic Algorithms" Systems, Man and Cybernetics, Part B, IEEE Transactions on vol. 31, Issue 3, Jun. 2001 pp. 459-467 Digital Object Identifier 10.1109/3477.931546.

Hu Guoqiang, et al., "Multiobjective Optimization Scheduling Based on Fuzzy Genetic Algorithm in Cascaded Hydroelectric Stations", Transmission and Distribution Conference and Exhibition: Asia and Pacific, 2005 IEEE/PES 2005 p. 1-4 Digital Object Identifier 10.1109/TDC.2005.1547075.

Dasheng Liu, et al., "A Multiobjective Memetic Algorithm Based on Particle Swarm Optimization", Systems, Man and Cybernetics, Part B, IEEE Transactions on vol. 37, Issue 1, Feb. 2007 pp. 42-50 Digital Object Identifier 10. 1109/TSMCB.2006.883270.

Rodriguez-Vazquez, K. et al., "Multi-Objective Genetic Programming for Nonlinear System Identification", Electronics Letters vol. 34, Issue 9, Apr. 30, 1998 pp. 930-931.

Pu Han, et al., "A Multi-Objective Genetic Programming/NARMAX Approach to Chaotic Systems Identification", Intelligent Control and Automation, 2006. WCICA 2006. The Sixth World Congress on vol. 1, 2006 pp. 1735-1739 Digital Object Indentifier 10.1109/WCICA. 2006.1712650.

Tan, K.C., et al., "Enhanced Distribution and Expoloration for Multiobjective Evolutionary Algorithms", Evolutionary Computation, 2003. CEC '03. The 2003 Congress on vol. 4, Dec. 8-12, 2003 pp. 2521-2528 vol. 4 Digital Object Identifier 10.1109/CEC.2003. 1299405.

Maceachern, L.A, "Constrained Circuit Optimization Via Library Table Genetic Algorithms" Circuits and Systems, 1999. ISCAS '99. Proceedings of the 1999 IEEE International Symposium on vol. 6, May 30-Jun. 2, 1999 pp. 310-313 vol. 6 Digital Object Identifier 10.1109/ISCAS.1999.780157.

Carrano, E.G., et al., "Electric Distribution Network Multiobjective Design Using a Problem-Specific Genetic Algorithm", Power Delivery, IEEE Transactions on vol. 21, Issue 2, Apr. 2006 pp. 995-1005 Digital Object Identifier 10.1109/TPWRD.2005.858779.

Dong-Hyeok Cho, et al., "Multiobjective Optimal Design of Interior Permanent Magnet Synchronous Motors Considering Improved Core Loss Formula", IEEE Transactions on Energy Conversion, vol. 14, Issue 4, Dec. 1999 pp. 1347-1352 Digital Object Identifier 10.1109/60.815071.

Li-Cun Fang, et al., "Concurrent Optimization for Parameters of Powertrain and Control System of Hybrid Electric Vehicle Based on Multi-Objective Genetic Algorithms", SICE-ICASE, 2006. International Joint Conference Oct. 2006 pp. 2424-2429 Digital Object Identifier 10.1109/SICE.2006.315114.

Kato, K., et al., "Large Scale Fuzzy Mulitobjective 0-1 Programs Through Genetic Algorithms with Decomposition Procedures", Knowledge-Based Intelligent Electronic Systems, 1998. Proceedings KES '98. 1998 Second International Conference on vol. 1, Apr. 21-23 1998 pp. 278-284 vol. 1 Digital Object Identifier 10.1109/ KES.1998.725859.

Esbensen, H., et al., "Design Space Exploration Using the Genetic Algorithm," Circuit and Systems, 1996. ISCAS '96., 'Connecting the World'., 1996 IEEE International Symposium on vol. 4, May 12-15, 1996 pp. 500-503 vol. 4 Digital Object Identifier 10.1109/ISCAS. 1996.542010.

Then, T.W., et al., "Genetic Algorithms in Noisy Environment", Intelligent Control, 1994., Proceedings of the 1994 IEEE International Symposium on Aug. 16-18, 1994 pp. 225-230 Digital Object Identifier 10.1109/ISIC.1994.367813.

Gopinath, D., et al., "An Integrated Methodology for Multiobjective Optimal Component Placement and Heat Sink Sizing", Components and Packaging Technologies, IEEE Transactions on [see also Components, Packaging and Maufactoring Technology, Part A: Packaging Technologies, IEEE Transactions on] vol. 28, Issue 4, Dec. 2005 pp. 869-876.

Dong-Joon Sim, et al., "Application of Vector Optimization Employing Modified Genetic Algorithm to Permanent Magnet Motor Design", Magnetics, IEEE Transactions on vol. 33, Issue 2, part 2, Mar. 1997 pp. 1888-1891 Digital Object Identifier 10.1109/20. 582654.

Ishibushi, H., et al., "Comparison Between Single-Objective and Multi-Objective Genetic Algorithms: Performance Comparison and Performance Measures", Evolutionary Computation, 2006. CEC 2006. IEEE Congress on Jul. 16-21, 2006 pp. 1143-1150.

Li Mingqiang, et al., "GA-Based Multi-Objective Optimization" Intelligent Control and Automation, 2000. Proceedings of the 3rd World Congress on vol. 1, Jun. 28-Jul. 2, 2000 pp. 637-640 vol. 1 Digital Object Identifier 10.1109/WCICA.2000.860050.

Wang, Jihua et al., "An Optimization-Based Algorithm for Job Shop Scheduling," University of Connecticut, Dept. of Electrical Engineering Publishing, MSL Papers, Mar. 28, 2004, p. 10.

International Search Report and Written Option for PCT/US06/36765.

Bäck, Thomas, et al., "Handbook of Evolutionary Computation," 1997, Publishing Ltd. and Oxford University Press, p. 14, lines 15-16.

Baeza-Yates R., et al: "Modern Information Retrieval, Chapter 5: Query Operations" Modern Information Retrieval, Harlow: Addison-Wesley, GB, 1999, pp. 117-139, XP002311981, ISBN: 0-201-39829-X.

Banks, Jerry, "Discrete-Event System Simulation," Second Edition, 1996, Prentice-Hall, Upper Saddle River, New Jersey, p. 3-55.

Banks, Jerry, "Handbook of Simulation: Principles, Methodology, Advances, Applications, and Practice," 1998, John Wiley & Sons, Inc., New York, New York. p. 15, line 15-22.

Banzhaf, Wolfgang, et al., "Genetic Programming: An Introduction On the Automatic Evolution of Computer Programs and Its Applications," 1998, Morgan Kaufmann Publishers, Inc., San Francisco, California, p. 14.

Beasley D., et al.: "An Introduction to Genetic Algorithms", Vivek, National Centre for Software Technology, Bombay, In, vol. 7, No. 1, pp. 3-19, XP001061908, ISSN: 0970-8618.

Cortinas, Marty: "HPS to remodel Ithink simulator." (High Performance Systems Inc's Ithink 5.0 business-modeling, simulation software) (Product Announcement). MacWEEK, v11, n26, p. 29(2), Jul. 7. 1997.

Ferber, Jacques, "Multi-Agent Systems: An Introduction to Distributed Artificial Intelligence," 1999, Addison Wesley Longman Limited, Harlow, Essex, England, p. 1-48.

Michalewicz, Zbigniew, "Genetic Algorithms + Data Structures = Evolution Programs," Third, Revised and Extended Edition, 1996, Springer-Verlag Berlin Heidelberg, p. 13-31.

Micro Saint 3.2 (278548); Micro Analysis & Design Inc., 4900 Pearl East Cir. #201E, Boulder, CO 80301, Jan. 1986.

Moss, Scott, et al., "Lecture Notes In Artificial Intelligence: Subseries of Lecture Notes in Computer Science: Multi-Agent-Based Simulation," Second International Workshop, MABS 2000, Boston, Massachusetts, July, Revised and Additional Papers, Springer-Verlag Berlin Heidelberg, p. 1-26.

Srinivas, M., et al.: "Genetic Algorithms: A Survey" Computer, IEEE Service Center, Los Alamitos, CA, US, vol. 27, No. 6, Jun. 1, 1994, pp. 17-26, XP000438318, ISSN: 0018-9162.

Zeigler, Bernard P., et al., "Theory of Modeling Simulation, Second Edition, Integrating Discrete Event and Continuous Complex Dynamic Systems," 2000, Academic Press, San Diego, California, p. 3-53.

Using Semantic Graphs in Clustering Process: Enhance Information Level—Brunner, B; Berrien, I; Web Intellegence, 2004. WI 2004. Proceedings. IEEE/WIC/ACM International Conference on Sep. 20-24, 2004 pp. 221-227; Digital Object Identifier 10.1109/WI.2004. 10106.

Multiobjective genetic optimization of diagnostic classifiers with implications for generating receiver operating characteristic curves—Kupinski, Ma.; Anastasio, M.A.; Medical Imaging, IEEE Transactions on vol. 18, Issue 8, Aug. 1999 pp. 675-685 Digital Object Identifier 10.1109/42.796281.

Robust optimal power control for ad hoc networks—Fridman, A.; Grote, R.; Weber, S.; Dandekar, K.R.; Kam, M.; Information Sciences and Systems, 2006 40th Annual Conference on Mar. 22-24, 2006 pp. 729-733 Digital Object Identifier 10.1109/CISS.2006. 286562.

Valenzeula, C.L., "A simple evolutionary algorithm for multi-objective optimization (SEAMO)", Evolutionary Computation, 2002, vol. 1, 2002, pp. 717-722.

Veldhuizen, D.A.V. et al., "Issues in parallelizing multiobjective evolutionary algorithms for real world applications," Proceedings of the 17th Symposium of the 2002 ACM Symposium on applied computing, Mar. 2002, pp. 595-602.

Ronald, S., "Duplicate genotypes in a genetic algorithm," Evolutionary Computation Proceedings, 1998. IEEE World Congress on Com- putational Intelligence., The 1998 IEEE International Conference on May 4-9, 1998 pp. 793-798, Digital Object Identifier 10.1109/ICEC.1998.700153.

Cranfield, et al., "Exposure of magnetic bacteria to simulated mobile phone-type RF radiation has no impact on mortality," Nanobioscience, IEEE Transactions on vol. 2, Issue 3, Sep. 2003 pp. 146-149, Digital Object Identifier 10.1009/TNB.2003.816227.

Valenzuela, Christine L., "A Simple Evolutionary Algorithm for Multi-Objective Optimization (SEAMO)," Evolutionary Computation, 2002, 1:717-722 (2002).

Van Veldhuizen, David A., "Issues in Parallelizing Multiobjective Evolutionary Algorithms for Real World Applications," Proceedings of the 17th Symposium on Proceedings of the 2002 ACM Symposium on applied computing, Mar. 2002, pp. 595-602.

* cited by examiner

METHOD AND SYSTEM FOR IMPLEMENTING EVOLUTIONARY ALGORITHMS

CLAIM OF PRIORITY

This application is a national stage application of PCT/US02/34571, filed Oct. 28, 2002, which claims priority to U.S. Ser. No. 60/335,654, filed Oct. 31, 2001, the contents of all of which are incorporated herein by reference in their entirety.

FIELD OF THE INVENTION

The present invention relates to methods and systems for implementing evolutionary algorithms in a parallel computing environment. More particularly, the invention efficiently performs evolutionary algorithms on computers interconnected via an intranet or the internet.

BACKGROUND OF THE INVENTION

Evolutionary algorithms (EA) have come to represent an important paradigm for solving or approximating the solutions to combinatorial optimization problems, especially hard optimization problems, e.g., the traveling salesman's problem. See, e.g., Zbigniew Michalewicz, *Genetic Algorithms & Data Structures=Evolution Programs* (Springer 1999).

To use the EA paradigm for a particular problem requires that possible solutions to the problem be parameterized by a data structure capable of the "genetic" operations to be described, and that the quality of the solution in the problem be represented by an objective (or "fitness") function applied to the possible solution. Genetic algorithms (GA) are special cases of EAs where the data structure parameter is a fixed-length list of values. In classical GAs, the values are single bits. The data structure parameter defining a possible solution is known as a "chromosome," and the individual elements of the data structure are known as "genes."

Generally, EAs search for increasingly good (or "fit") solutions, or even an optimal solution, by performing a number of repeated transformations or iterations on a collection of possible solutions. Each possible solution is known as an "individual"; the collection of possible solutions is known as a "population"; and each iteration is known as a "generation." Generally, the number of individuals in a population is constant from generation and is an important EA parameter.

In more detail, each generation includes four basic steps. In a first step, the, individuals are selected from the general population for the next step. Selection of individuals may require global information to determine which individuals are chosen from the population. In the classic selection method, individuals are probabilistically selected based on their relative fitness with respect to the total fitness of the population. Thus, the higher the fitness, the more likely the individual would be selected for the next step. In another selection method, individuals are probabilistically selected based on fitness rank within the entire population (rank-based selection), or on fitness rank within a random sample of the population (tournament selection). In a further alternative, the more fit individuals in the population are selected (elitist selection).

Next, in a second step, the selected individuals are altered to form new individuals by performing genetic operations. In most cases, the genetic operators include "mutation," in which part of the data structure parameterizing an individual is randomly changed, and "crossover," in which portions of the parameterizing data structures of two individuals are exchanged. The frequencies of mutation and crossover (and how individuals are chosen for crossover) are further EA parameters. For example, in classical GAs where the data structure parameter is a bit string, mutation may flip one bit, while crossover may exchange portions of two strings.

In the third step, the fitness of all the new individuals in the population at the current generation is determined by applying the fitness (or objective) function.

In the last step, the individuals that will comprise the succeeding population are determined. The succeeding population is ordinarily formed in one of two ways. In generational reproduction, each new individual created by the second step replaces one of the parents, sometimes keeping the best parent (elitism). Alternatively, the generational reproduction method requires that the new individual must be better than both parents in order to remain, otherwise both parents remain. The other method is known as steady-state reproduction. In steady-state reproduction, both parents are retained, and the fitness evaluation performed in the third step determines which individuals in the whole population are the least fit. These least fit individuals are removed from the population, thus reducing the population to its original size.

An initial population of individuals may be created by simply randomly assigning content to the parameterizing data structure (the chromosomes). For classic GAs, bits in the bit string may be randomly set to zero or one.

Because EAs operate on populations of semi-independent individuals, they offer many opportunities for parallelization. In a simplest parallelization technique, computation of the fitness function for each individual, which is often the most computationally intensive part of an EA, may be done in parallel. Additional parallelization techniques are known in the art. See, e.g., Brick Cantu-Paz, *Efficient and accurate parallel genetic algorithms* (Kluwer Academic 2000), and Schmeck et al., *Parallel implementations of evolutionary algorithms*, in *Solutions to Parallel and Distributed Computing Problems* 47-68 (Zomaya et al. eds., Wiley 2001). In particular, the following three parallelization techniques are known.

The farming model: Here, the population selection step is performed on only one processor, while pairs of individuals are distributed to other processors for genetic alteration and the usually time-consuming fitness evaluation. This model is suited for systems with a small number of processors.

The island model: In this model, the population is divided into a number of "subpopulations." Subpopulations are assigned to separate processors where they evolve independently, except for occasional exchanges of individuals between neighboring subpopulations. Subpopulations are neighboring if they are adjacent according to a chosen communication topology, for example a ring interconnection of the subpopulations. This model is suited to clusters of workstations, each powerful enough to process a whole subpopulation, and with relatively high bandwidth communication connections.

The diffusion model: Here, a spatial distribution is defined on all the individuals in the population, and selection is restricted to only those individuals in a local neighborhood. This model is suited to a highly parallel single instruction stream, multiple data stream computer, with each individual being assigned its own processor. Communication in this model is purely local, and the computational requirements on each node are limited.

The latter two techniques are not formally exactly equivalent to the standard EA paradigm. Instead, in these latter models, the selection process has been distributed and localized (instead of operating on the population as a whole) in order to reduce inter-processor communication.

However, the known parallelization techniques for EAs have been developed with particular parallel computing platforms in mind. In particular, these techniques expect that both processor and also inter-processor communication capabilities are preferably homogenous, or at least known in advance. Such expectations are met by, for example, dedicated massively parallel systems, or by dedicated local clusters of workstations on a local high-speed interconnection.

But some of the most ubiquitous parallel systems available currently, intranets or the Internet, meet none of these expectations. In particular, they have heterogeneous capabilities, have unpredictable processor availability, and have unpredictable and generally low communications bandwidth.

Heterogeneous capabilities: Usually, the computers connected to these networks are of widely differing capabilities, ranging from simple PCs to powerful workstations or mainframes.

Unpredictable availability: The connected computers may be otherwise used, and spare computing power available for other tasks, such as EA processing, is therefore unpredictable.

Low and unpredictable bandwidth: Different computers have vastly different network connections, ranging from direct connection to backbone to a slow analog modem. Overall, the connections are slow compared to connections within local clusters of computers.

None of the known parallelization techniques are suited to these most common examples of parallel systems.

For example, low and unpredictable communication bandwidth severely limits the use of both the farming model and the diffusion model, since these models have communication demands that require high and predictable bandwidth. Further, subpopulations that are local according to the selected topology may reside on real processors that are a considerable distance apart, further burdening the communications connections.

On the other hand, use of the island model is also severely limited by heterogeneous and unpredictable processor capabilities. Variable processor capabilities lead to highly uneven evolution of the separate subpopulations. Subpopulations on slower processors will evolve less rapid than subpopulations on a faster processor. Then, when individuals migrate from slower to faster processors, the immigrants will be generally less fit than the natives, and will be rapidly eliminated by selection. Thus, computing resources of the slower processors is effectively wasted. See, e.g., Branke, et al., *A distributed genetic algorithm improving the generalization behavior of neural networks*, in *Machine Learning: ECML-95*, 912 LNCS 107-21 (N. Lavrac and S. Wrobel, eds., Springer 1995).

What is needed, and what is lacking in the prior art, is a technique that exploits the natural parallelism in EAs in networks of heterogenous computers with heterogeneous and generally slow communications bandwidth.

SUMMARY OF THE INVENTION

Objects of the present invention include overcoming these problems in the prior art. Accordingly, this invention provides an efficient and effective implementation of general evolutionary algorithms (EA) as a number of communicating and cooperating processes, which is particularly suited for heterogeneous computer networks such as intranets, the Internet, or the like. Especially, this invention enables exploitation of otherwise unused computing power of networked computers for application of EAs to large, real-world optimization problems.

These objects are accomplished by setting aside one, distinguished processes (designated herein the "central" process) to maintain a pool ("central pool") of "individuals" for distribution to, and "evolution," by the other processes (designated herein the "peripheral" processes). The designations "central" and "peripheral" are to be understood functional labels used without any other limitation intended. In particular these terms are to be understood as carrying no implications of spatial arrangement, geographical allocation, or so forth. For example, the central and peripheral processes may be physically located on a single processor machine, a machine with multiple processors, or they may be distributed among several machines.

When a peripheral process is available for work, it notifies the central process, which then provides it with an allocation of individuals for evolution according to the EA being implemented. The peripheral process then evolves these individuals through a number of "generations," then returns the evolved population to the central process, and then again requests additional work.

When the central process receives a request for work from a peripheral process, it migrates a collection (also called a "subpopulation") of individuals to the peripheral process. The individuals picked most preferably have fitness values forming a contiguous range (or, preferably, relatively similar fitness values) with respect to the fitness values of all the individuals in the central pool. When the central process receives an evolved population from a peripheral process, the evolved individuals are merged into the pool. For the migration and merging, it is advantageous for the central pool to be maintained in an order sorted according to fitness. A sorted central pool is called herein a "central buffer."

Advantageously, this invention limits competition between individuals of widely different fitness by distributing subpopulations selected to have relatively similar fitness to the distributed processes. Individual selection and subpopulation evolution occur only in the peripheral processes. Communication between the processes is reduced because subpopulations evolve for several generations in the peripheral processes without any intervention by the central process.

The invention consists generally of a method of performing an evolutionary algorithm on a network of heterogeneous computer processors, comprising the steps of creating a set of subpopulations of individuals, processing each subpopulation with the evolutionary algorithm until a termination condition is reached, migrating individuals so that each subpopulation contains individuals of relatively similar fitness, and, repeating the processing and migrating steps until an ending condition is reached.

One aspect of the invention refines the migrating step by merging the incoming subpopulation into a central pool of individuals ordered by fitness and transferring an outgoing subpopulation of relative similar fitness from the central pool. Other features include keeping the number of individuals in each subpopulation equal, or alternatively sizing the number of individuals in each subpopulation relative to the processing capability of the processor. More features include performing all steps on a single processor, or alternatively using one or more peripheral processors to perform the processing step, and locating each subpopulation on a peripheral processor.

Another aspect of the invention refines the migrating step by merging the incoming subpopulation into an intermediate pool of individuals ordered by fitness and transfers an outgoing subpopulation of relative similar fitness from the intermediate pool, and includes an additional step of exchanging individuals between intermediate pools with a central pool after a certain number of subpopulation migrations.

The invention also includes a computer program storage media, containing encoded software instructions including an evolutionary algorithm, wherein the encoded instructions cause one or more computer processors to create a set of subpopulations of individuals, process each subpopulation with the evolutionary algorithm until a termination condition is reached, migrate individuals so that each subpopulation contains individuals of relatively similar fitness, and, repeat said process and migrate steps until an ending condition is reached.

Citation or identification of any reference in this Section or any section of this application shall not be construed that such reference is available as prior art to the present invention.

BRIEF DESCRIPTION OF THE DRAWINGS

The present invention may be understood more fully by reference to the following detailed description of the preferred embodiment of the present invention, illustrative examples of specific embodiments of the invention and the appended figures in which.

DETAILED DESCRIPTION OF THE PREFERRED EMBODIMENT

As a preliminary matter, although the invention is described herein as, inter alia, a method for implementing EAs, it is equally applicable to implementing other similar algorithms, such as genetic algorithms. One of skill in the art will recognize from the following description that the invention may be used to implement algorithms that maintain a population of intermittently interacting, independent individuals that have associated fitness values or ranks.

Further, although the invention is also described as including communicating processes which carry out work requests, these processes are functional descriptions without any limitation intended concerning implementation in any particular operating system (OS). For example, in one implementation, the functional processes described are implemented as actual OS processes, while in another implementation no such OS processes may be discernible. In the latter case, the process functions maybe performed by native OS components and may be triggered by message exchanges. Such variations as may be necessitated due to detail of a particular OS and particular hardware are therefore within the scope of the present invention.

Also, for concreteness of description only, and without any limitation, the preferred embodiments are described herein using the notation introduced above along with the further notation. The EA being implemented is considered to have M individuals (designated $d_1, \ldots, d_M$); the method is considered to have N communicating functionally-defined processes (designated $P_1, \ldots, P_N$).

Both M and N may be variable during the method, as will become clear from the following description. Anticipating the following description, the number of processes, N, may vary, because, since the central process passively responds to peripheral processes, upon creation a new peripheral process will simply request additional work like the already created peripheral processes. The number of individuals may easily be varied, because new individuals may be simply merged into the central pool (subject resource constraints), while individuals may be destroyed by simply deleting them from the central pool.

Figure 1:
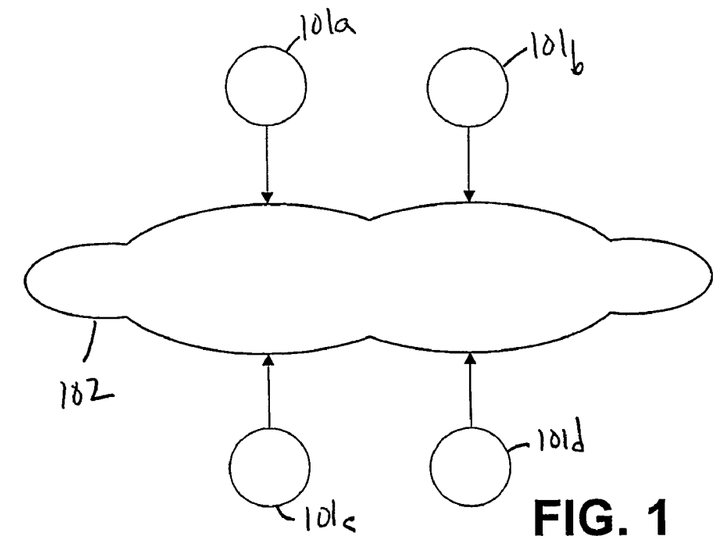
FIG. 1 depicts an embodiment of the functional structure of the present invention.

Now, FIG. 1 illustrates a preferred embodiment of the functional structure of the present invention, which includes communicating processes 101a-101d that cooperate to implement a wide range of preselected evolutionary algorithms (EA). The implemented EA may be selected from a virtually unlimited variety of evolutionary algorithms (or structurally similar algorithms) virtually any nature or complexity as known in the art and directed to the solution of a combinatorial optimization problem (or structurally a similar problem) of virtually any type. See, e.g., *Solutions to Parallel and Distributed Computing Problems* (Zomaya at al. (eds.)) (describing the use of EAs for a wide range of problems).

Preferably, but not necessarily, one of the processes, for example process 101a, is designated as a central process, while the remaining processes, processes 101b-101d, are designated as peripheral processes. All processes communicate through interconnection 102, which may be any type of a local or remote interprocess communication mechanism. The functional topology of interprocess communication is a "hub-and-spoke" with the central process being the hub and the peripheral processes being the spokes. The actual physical topology within interconnection 102 is not otherwise limited.

Figures 2A, 2B:
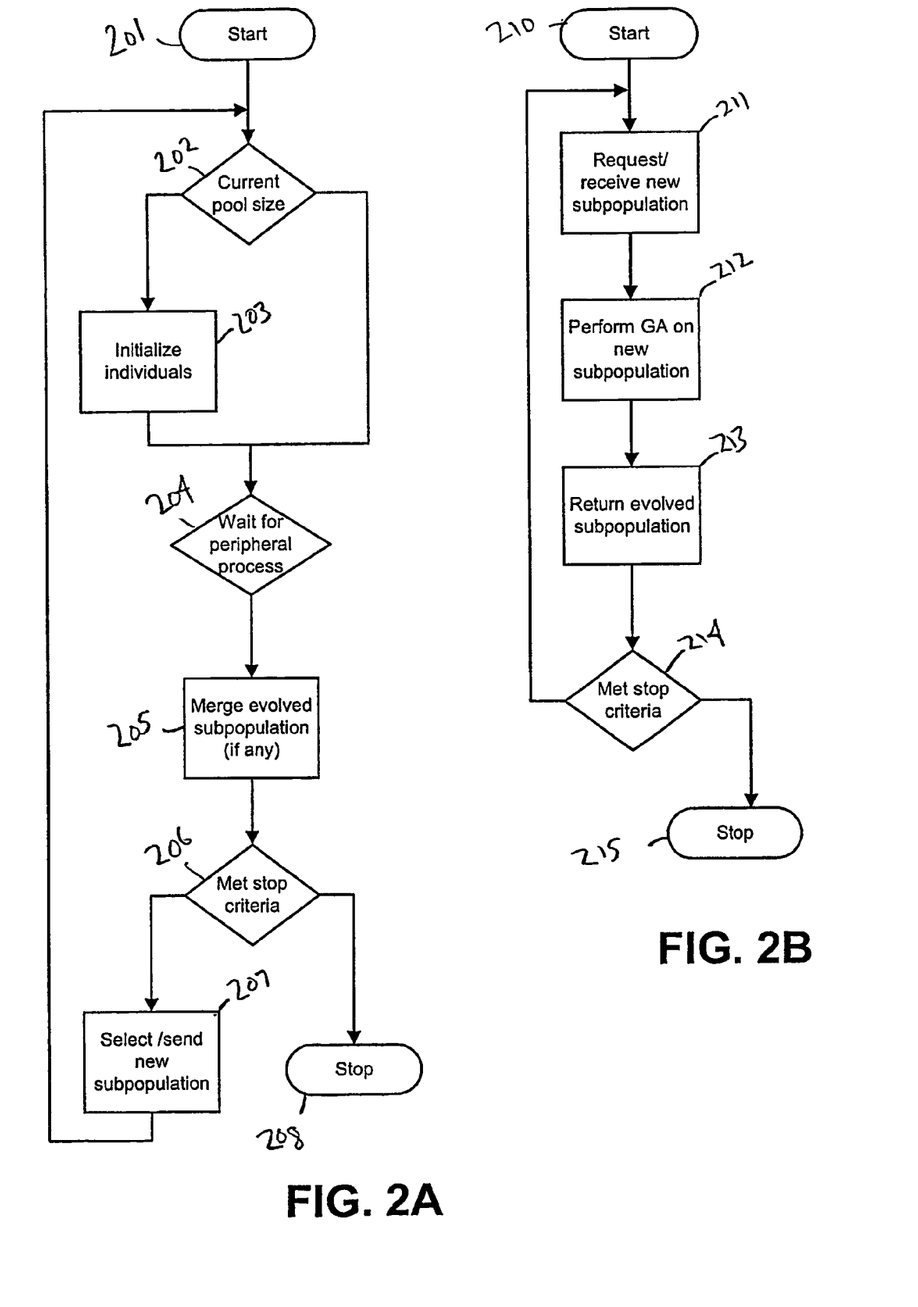
FIGS. 2A and 2B depict flow charts of the methods of this invention.

FIGS. 2A and 2B generally illustrate preferred embodiments of the functional processing of a central process and of a peripheral process, respectively, which cooperate to implement a preselected EA. With reference first to FIG. 2A, the central process starts and initializes itself at 201, and then proceeds to test 202 how many individuals are currently in its central pool of individuals. If the current number of members is adequate, then the central process proceeds to wait 204 for a work request from a peripheral process. If the pool size is inadequate, additional individuals are initialized 203. Individual initialization typically may require finding the fitness of the newly generated individuals. Alternatively, the new individuals may simply be assigned an average (or a minimum) fitness.

Initially, the pool will be empty and an initial number of individuals may be initialized, where the initial number may be, for example, an input parameter of the method. Later during processing, it is advantageous to dynamically maintain the pool size so that it is unlikely that a work request from a peripheral process must be delayed because there are insufficient, or no, individuals in the pool. If a delay occurs, then in one embodiment the number of individuals (and perhaps the maximum possible pool size) may be increased. This could be achieved by generating newly initialized individuals, e.g. either randomly (but if random, preferably during the preliminary generations of the execution of the algorithm) or by duplicating some individuals. If the pool becomes too full, then resources may be allocated to increase the maximum pool size. Alternatively, individuals could be removed from the pool to clear space, e.g. by removing the least fit individuals.

For a concrete example, let the average number of individuals processed by each peripheral process at a certain time be P, so that M (the total number of individuals)=N (the total number of processes at a certain time)*P. Then it is preferred that the maximum capacity of the pool be approximately (within 10%) M individuals. And at any time during processing, it is preferred that the pool be from 40-60% full, or less preferably from 30-70% full, or have at least P individuals.

Individuals are initialized 203 preferably by random generation or by taking into account some prior heuristic knowledge. In random generation, elements of the chromosomal data structure parameterizing an individual are randomly selected according to a probability distribution. Possible probability distributions are the uniform and the Gaussian distribution. For example, for a chromosome which is a bit string, as for classical GAs, the bit may be randomly set as zero or one with equal probability. Although FIG. 2A illustrates that individuals are initialized by the central process, in an alternative implementation, the central process may instruct a peripheral process to initialize individuals for its immediate use (thereby avoiding some communication between the processes).

If the current pool size is adequate, then the central process waits 204 for the next work request from a peripheral process. When a work request arrives, the evolved subpopulation just processed by the peripheral process is merged 205 into the central pool. In case the peripheral process has just started, it will have no evolved subpopulation to return, and the central process may bypass merging 205. Peripheral processes will startup during initialization, and may occasionally startup and join the ongoing processing even after initialization. The merging and migrating operations are described subsequently.

Next, the current status of the processing is evaluated to determine if one or more stop criteria have been met 206. If so, processing is stopped 208. Stopping may involve, for example, stopping immediately upon meeting the stop criteria, or waiting for all peripheral processes to finish performing the EA and to return their evolved subpopulations, or waiting until most (75%) do so, or waiting a fixed time for most to do so, or so forth.

However stopping is performed, the contents of the central pool after stopping is completed defines the results of the EA implemented according to the present invention.

If processing is to continue, the central process migrates 207 a new subpopulation to the peripheral process so that it may be evolved according to the EA being implemented. Finally, the central process again tests the current size of the central pool and waits for the next peripheral-process work request.

Next, FIG. 2B generally illustrates the processing of any of the peripheral processes. A peripheral process starts and initializes itself at 210, and then proceeds to request 211 a new subpopulation of individuals to evolve. Preferably, the central process will select and send 207 a new subpopulation from the central pool with a delay determined principally by the inter-process communication overhead.

Next, the peripheral process processes 212 the subpopulation according to the preselected evolutionary algorithm (EA). The general steps performed are fitness determination, genetic alteration, and selection as previously described. Preferably, the peripheral process includes a local subpopulation pool that holds the individuals of the subpopulation, and the EA evolves the individuals in this local pool. Since the processing of subpopulations can occur independently of other subpopulations, such processing may be performed concurrently, on two or more processors either along with or separate from the central process.

Processing 212 continues until a termination condition is reached. In a preferred embodiment, this termination condition may be defined in terms of the EA being implemented. For example, the processing may be terminated after a predetermined number of generations have occurred, the predetermined number optionally depending on the relative number of individuals in the subpopulation. Alternatively, the processing may be terminated after the fitness level in the subpopulation has reached a level where it is not significantly improving, i.e., relatively unchanging (for example a relative improvement of less than 0.1%— or 0.5%, or 1%, or so forth—per generation).

After the EA processing step reaches the termination condition, the subpopulation is returned 213 to the central process for merging 205 into the central pool. Because a previous migration step transferred the same number of individuals in the outgoing subpopulation from the central buffer, the size of the central buffer remains fixed.

Finally, the peripheral process determines whether or not to stop 214. Peripheral-processes may be notified to stop by the central process, or may stop themselves after using a predetermined amount of processor resources, or may be stopped by a user of the processor on which the process executes, or so forth.

Next, the central pool of individuals and the operations of migrating subpopulations from and merging subpopulations into the central pool are described. In a preferred embodiment, illustrated in FIG. 3, the individuals in the central pool are maintained in an order sorted (or ranked) according to fitness. Accordingly, the individuals, for example, individual 304, present in central pool 302 at a typical moment during the method of the present invention are arranged with the most fit at the top of the illustrated pool, and the progressively less fit arranged progressively further down in the illustrated pool. (Available free space in the pool is not illustrated.) As described above, the central pool is preferably maintained with (0.4-0.6)*(M) individuals, where M is the total number of individuals being processed. Local pools 301 and 303 of peripheral processes (perhaps the same peripheral process) are illustrated with a smaller number (P) of individuals.

Figure 3:
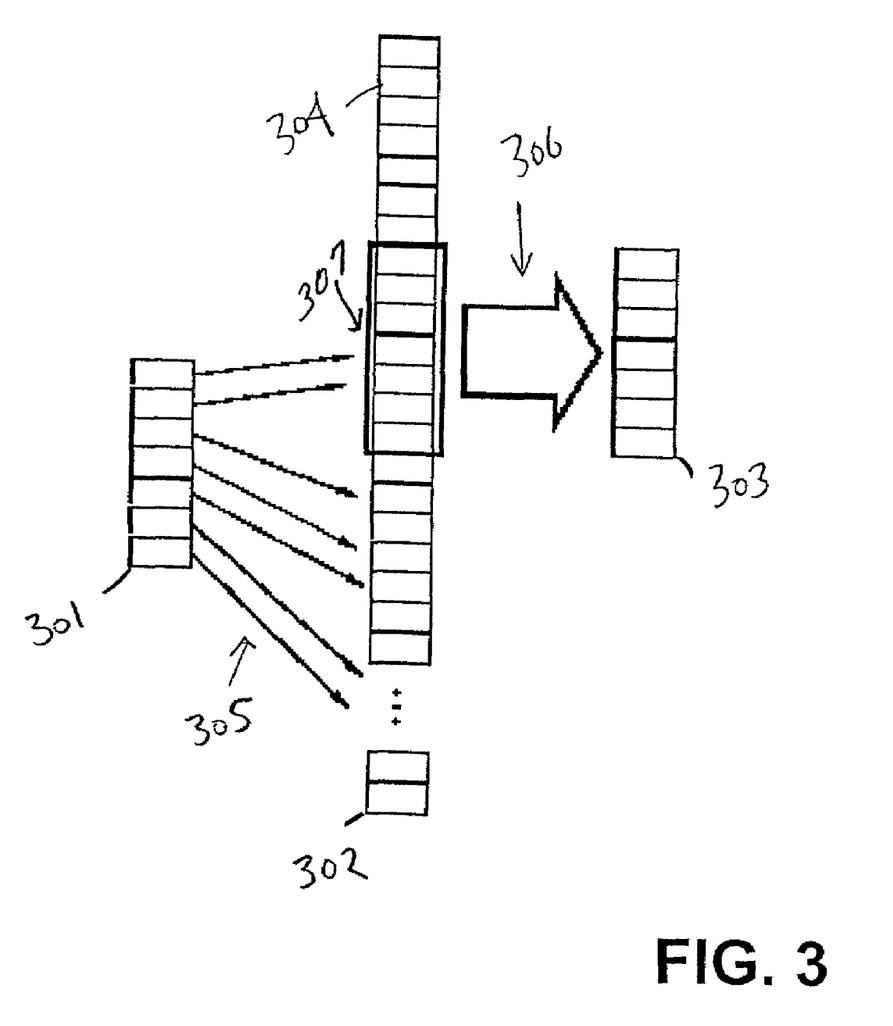
FIG. 3 depicts a preferred embodiment of selecting and merging individuals.

The operation of migration 306, first, selects a subpopulation of individuals from the central pool chosen on the basis of their fitness relative to all individuals in the central pool when chosen, and, second, sends the selected subpopulation (via the inter-process communication facilities) to a local pool 303 of a peripheral process, where it is evolved according to the preselected EA. This operation is performed upon request from a peripheral process after the peripheral process completed evolving its current subpopulation and is thus free for more work. If necessary, the peripheral process may queue at the central processor until a new subpopulation is available.

Preferably, the subpopulation has similar relative fitness. In one alternative, a subpopulation may be selected according to a template or randomly from a more numerous collection of individuals forming a contiguous range of fitness in the central pool. For example, a subpopulation of P individuals may be selected as every other individual from 2.0*P individuals with contiguous fitness, or randomly from 1.5*P individuals with contiguous fitness, or so forth. In another alternative, groups of individuals with superior fitness may be dispatched from the pool more frequently than those with poorer fitness. In yet another alternative, the processing speed of the hardware running the peripheral process will determine the average fitness of the group selected. Less preferably, a subpopulation is selected randomly from the whole central pool, or is selected by any of the means described for selecting individuals for alteration in the EA (classic, elitist, or tournament, etc.).

More preferably, the subpopulation has a contiguous range of relative fitness with respect to all the individuals in the central pool. Thus, FIG. 3 illustrates subpopulation 307 having a contiguous range of relative fitness in central pool 304 being selected and sent to local pool 303 in a peripheral process. The contiguous fitness range selected in the preferred embodiment may itself be chosen in several manners. In one manner, it is selected in a round-robin order by fitness rank so that all individuals receive a uniform chance for further evolution. In another manner, it may be selected in a priority order by fitness so that the most fit individuals received the greatest chance for further evolution. It may also be selected randomly with respect to fitness, or by a combination of several methods.

The operation of merging 305 receives a subpopulation of individuals that have finished evolution in the local pool 301 of a peripheral process and inserts them back into central pool 304. If the central pool is maintained in fitness order, a subpopulation is merged with individuals in the central buffer, thus retaining the fitness ordering. If the central buffer is empty, the subpopulation is merely inserted into the central buffer in fitness order. Preferably to improve merging efficiency, individuals in the subpopulation are ordered by their relative fitness in the local pool by the peripheral process before being sent to the central process. Here, FIG. 3 illustrates a subpopulation in priority order in a local pool, being merged 305 in fitness order into central pool 302. The separate arrows 305 illustrate where the separate individuals from the local pool fit into the central pool in fitness order.

It is also advantageous to set aside a copy of the most fit individual discovered so far in a location separate from the central pool. Alternatively, copies of the most fit few (for example, five to ten) individuals may be stored Although, the central pool has been described as maintained in the preferred fitness order, other data structures are possible, preferably data structures that make selection based on priority and merging efficient operations. For example, the central buffer may be maintained as a "fitness-ordered" heap. Less preferably, the central pool may be stored in any fashion, for example as an unordered set.

Finally, it will be apparent that this method is not critically affected by failure of a peripheral process. Failure of a peripheral process merely results in loss of the individuals it is currently evolving and the accumulated results of their prior optimization. The central process may compensate for failure by simply initializing new individuals to make up for those lost, and sending them for evolution when requested. Also, a new peripheral process may easily be started to replace a failed process (or simply to increase the throughput). The new peripheral process will request a subpopulation from the central pool and then begin evolving the requested subpopulation according to the EA being implemented.

It is also to be understood that such variations in the methods and data structures described herein as will be apparent to one of skill in the art upon reading the present specification are included within this invention and within the scope of the appended claims.

Alternative Embodiments

The present invention has alternative embodiments, several of which are described herein. In a first alternate embodiment, the size of the subpopulation selected and sent to a peripheral process may be varied in dependence on the processing capability of the processor hosting the peripheral process. Such variation takes into account any heterogeneity of the processors executing the methods of the present invention, and permits relatively equal number of generations to occur on each distributed processor and for each subpopulation. This requires knowledge of the relative processing ability of the distributed processor hosting a peripheral process before selecting a subpopulation size. Also, the central pool will preferably have resources that are capable of holding all the subpopulations at once, and sufficient individuals should be initialized to insure all distributed processors may be simultaneously active.

This invention may use any of the wide range of stopping criteria known in the EA arts appropriate for the EA being implemented. In a preferred embodiment, the method stops when the total number of evolution cycles reaches a predetermined limit. In an alternate preferred embodiment, the method stops when measures of the fitness of the current population cease to improve significantly (for example, by less than 0.05%— or 0.1%, or 0.5%, or 1%—for each new generation of the population). Fitness measures that may be used include the maximum fitness discovered to the current time, the maximum fitness at the current time, the average fitness, the minimum fitness, or so forth.

In a further alternate embodiment that reduces communications costs at the central process, the processes of the invention may be structured into a preferably two-level tree (more levels are possible) instead of a hub-and-spokes arrangement (or a one-level tree). The central process is at the root of the tree; intermediate processes are at the intermediate nodes of the tree; and peripheral processes are at the leaves of the tree. Each intermediate process has an intermediate pool of individuals, and acts like the "central process" described above with respect to its dependent peripheral processes But when individuals in an intermediate pool have performed a certain number of evolutions (or have processed for a certain time, or so forth), the population contained in the intermediate pool may be returned to the central process and merged into the central pool and a subpopulation, preferably of similar relative fitness, would be selected and sent to the intermediate process.

In yet another alternative embodiment, the central pool maintains only the minimum data concerning the individuals with detailed data and code being retained at the peripheral processes. For example, the central pool may maintain only the identity and fitness of each individual. In this embodiment (preferred aspect), the central processor maintains a list of the identity of individuals in the entire population ordered by fitness, and periodically signals the distributed process to stop and return the identity and fitness of individuals in the evolved subpopulation to the central pool. Optionally, the peripheral processes may notify the central process of their progress in order to account for processor heterogeneity. Upon selecting a new subpopulation, the central process sends only the identities and fitness to a requesting peripheral processor. The peripheral processor obtains the remaining data and code defining the individuals by directly requesting such from the peripheral processors where each individual currently resides (but are not being evolved).

Conceptually, this requires functional communication structured as a complete graph among all the processes, the central process and the peripheral processes. Since the communications between distributed processors would be intense during the exchange migration period, in an intranet environment a device like a switch that provides separate communications paths between nodes would be preferable to a hub which provides only one path between nodes at a given time.

This latter alternative is exemplary of further embodiments where the functions of the central process are performed in a distributed manner by the peripheral processes. Methods of function distribution and parallelization can be used that are known in the art. These alternatives are typically not subject to failure of the central process, which critically affects distributed implementations.

Systems and Program Products of the Invention

Figure 4:
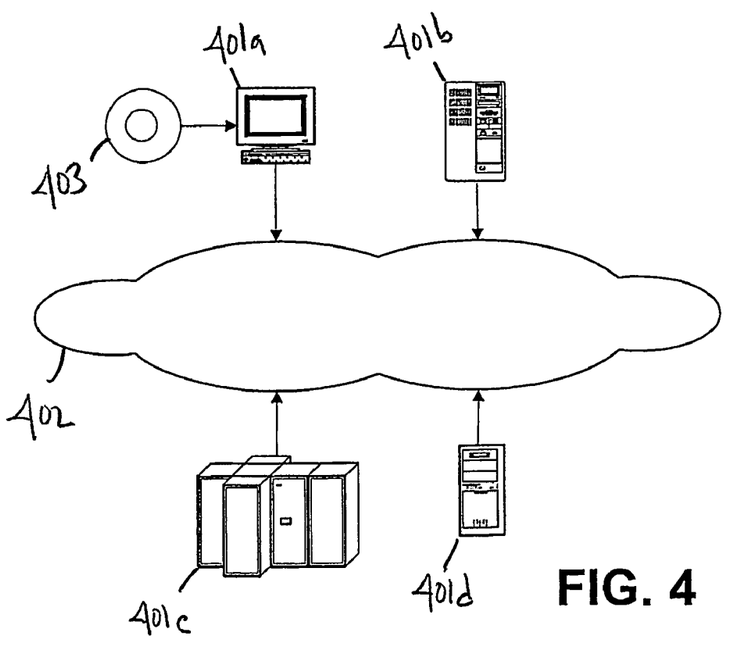
FIG. 4 depicts an exemplary computer system suited to the present invention.

The cooperating functional processes of this invention may advantageously be executed on a parallel computer system. FIG. 4 depicts an exemplary system for executing the processes of the present invention. Here, computers 401a-401d (of standard types and constructed as known in the art) are connected for intercommunication by network 402. The illustrated computers are of heterogeneous types, such as PC computer 401a, workstation computer 401d, mainframe computer 401c, and minicomputer 401b. Other types of computers, such as massively parallel computers may also be used. Network 402 may be of a wide variety of types, including a machine bus, an intranet, the Internet, or an analog or a packet switched telephone network.

The processes, as illustrated in FIG. 1, may be conveniently assigned to these computers in any way, but will preferably be assigned to balance computer loads and to maximize the throughput. For example, several processes may be assigned to powerful computers, such as mainframe 401c, a few processes to computers of intermediate capability, and only one or two to less powerful personal or workstation type computers, 401a and 401d.

The central process may be assigned to any computer, but is preferably assigned to that computer used by the user for controlling the method of this invention. Thus, it may be assigned to PC computer 401a.

In a preferred embodiment, processes of this system will use background resources of the various computers that are not otherwise used. For example, arrangements are known that permit any Internet-attached computer to perform background work on an as available basis for a distributed processing task. This invention may be used with arrangements. See, e.g., Parabon Computation, Inc. (Fairfax, Va.; www.parabon.com).

Additionally, a further embodiment of this invention is computer software stored upon media that will enable a computer such as PC computer 401a, workstation computer 401d, mainframe computer 401c, and minicomputer 401b that reads storage media 403 and loads the software to perform the method of the invention as previously described. This software can be stored on any computer readable media such as, but not limited to, magnetic disk or tape, or optical media such as a CD ROM.

An Example of the Invention

The following example demonstrates the effectiveness of the present invention and its superiority to prior art parallelization techniques, e.g., the island model.

To execute the methods of the present invention, and the island model, a distributed computing environment of ten independent and heterogeneous processors was simulated on a single processor computer. Time was measured by the number of generations, so that the overheads of selection, reproduction or mutation, and communications were neglected. Processing speed was simulated in terms of the number of "global cycles" a processor needs to process one generation. The simulated processors ranged from one to ten global cycles, or a 10-fold speed range.

The EA selected was directed to optimizing f(y), which was defined by the two following equations.

$$x_i = \begin{cases} y_i \cos(\pi/6) - y_{i+1} \sin(\pi/6) & : i = 0, 2, 4, 6, 8 \\ y_i \cos(\pi/6) + y_{i-1} \sin(\pi/6) & : i = 1, 3, 5, 7, 9 \end{cases}$$

$$f(y) = \sin(x_i) * \sin\left(\frac{i+1}{\pi} x_i\right)$$

(This problem was suggested by Michalewicz and used in a contest at the Evolutionary Computing Conference in 1999). Each individual was defined by a gene that included a list of the 10 real values: $y_i$, i=0, ..., 9. The selected EA was further defined in a standard manner using linear rank-based selection, steady-state reproduction, mutation probability of 0.1 for each gene, and crossover probability of 1.0. The subpopulation size was 50, and there were 10 subpopulations for a total of 500 individuals. These settings were used both for the methods of this invention and for the island model, so that processing of the invention and of the island model was performed under the same conditions.

Further settings used for the first experiment are described next. For the invention, the central pool size was set to 500, and a subpopulation was allowed to evolve for 20 generations in each peripheral process until it was returned the results to the central pools. For the island model, a ring topology was used, with a migration interval of also 20 generations. Each experiment was run 50 times using different seeds.

Figure 5:
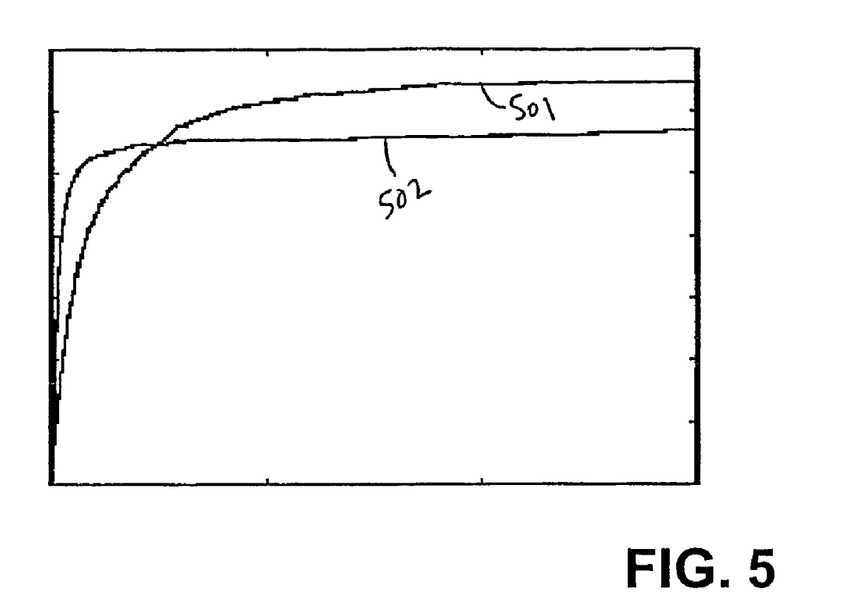
FIG. 5 depicts a comparison of the invention with an island model.
Figure 6:
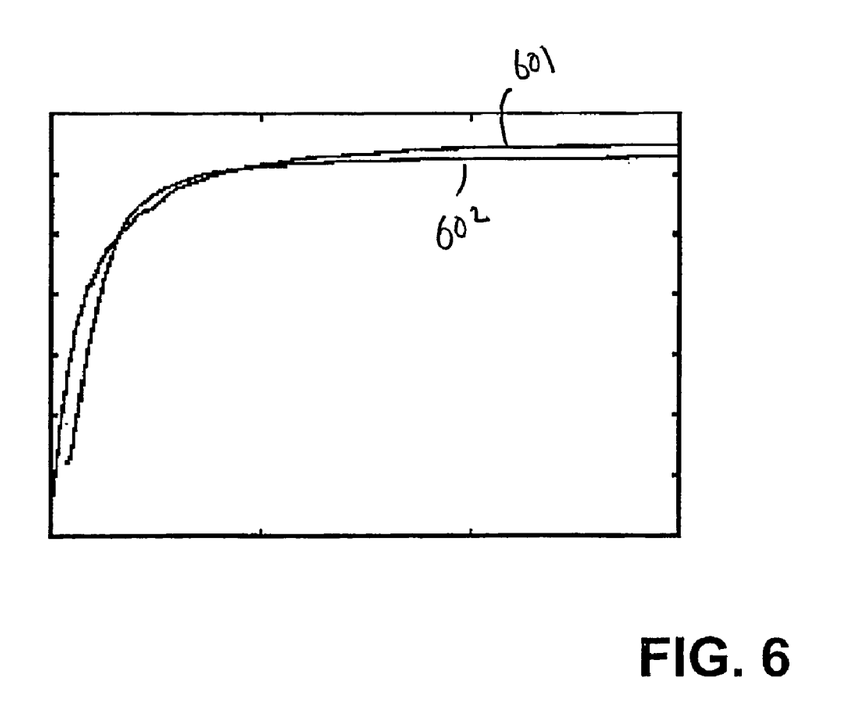
FIG. 6 depicts a comparison of the invention with an optimized island model.

In FIGS. 5 and 6, illustrating experimental results, solution quality (fitness) increases along the vertical axis, and the number of generations increases along the horizontal axis.

FIG. 5 illustrates the results of the first experiment on the heterogenous system simulated, where curve 501 are the results of the methods of this invention, and curve 502 is the result of the island model. The present invention clearly reaches a final solution that is considerably over the solution of the island model, although this invention does converge somewhat slower.

In a next experiment, the EA parameter settings were tuned to optimize performance of the island model regardless of any deleterious effect on the methods of this invention. Optimized results for the island model were obtained with a subpopulation size of 400 (not 50) and a migration interval of 40 (not 20) generations. The same parameters were used for the methods of this invention.

FIG. 6 illustrates the results of this second experiment, where curve 601 are the results of the methods of this invention, and curve 602 is the result of the island model. Even compared against an optimized island model, the present invention converged to a better final solution than the island model.

This example clearly demonstrated the usefulness and effectiveness of the present invention and its superiority to the island model.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

A number of references are cited herein, the entire disclosures of which are incorporated herein, in their entirety, by reference for all purposes. Further, none of these references, regardless of how characterized above, is admitted as prior to the invention of the subject matter claimed herein.

What is claimed is:

1. In a computer system comprising a central processor and a plurality of peripheral processors, and at least one user interface including at least one input device and at least one output device, a method comprising:
   a) receiving by means of at least one of the at least one input devices information concerning an optimization problem,
   b) in response to a communication from one of the plurality of peripheral processors to the central processor, selecting a subpopulation of candidate solutions to the optimization problem from a pool of available candidate solutions, said subpopulation being selected from among a plurality of candidate solutions having fitness values found in a contiguous subrange among fitness values of available candidate solutions in the pool,
   c) processing the subpopulation according to an evolutionary algorithm until a termination condition is reached,
   d) merging the subpopulation whose processing has terminated back into the pool,
   e) repeating said selecting, processing, and merging until an ending condition is reached, and
   f) generating an output signal based upon the candidate solutions in the pool, and providing that output signal including information about at least one candidate solution to the optimization problem to a user by means of at least one of the at least one output devices,
   wherein the central processor maintains the pool, and two or more peripheral processors of heterogeneous capabilities communicatively linked to the central processor process the subpopulations, and
   wherein the contiguous subrange of fitness values from which the selection is made in at least one iteration of step b) does not overlap the contiguous subrange of fitness values from which the selection was made in at least one prior iteration of step b).

2. The method of claim 1, wherein each subpopulation has the same number of candidate solutions.

3. The method of claim 1, wherein a size of a subpopulation is selected in dependence on a capability of a processor responsible for processing the said subpopulation.

4. The method of claim 1 wherein processing a subpopulation according to the evolutionary algorithm comprises one or more generations, each generation comprising:
   selecting a plurality of candidate solutions from the subpopulation based on a fitness of each candidate solution,
   creating a plurality of new candidate solutions by applying evolutionary operators to the selected plurality of solutions, and
   evaluating the fitness of a plurality of the created solutions.

5. The method of claim 4 wherein the termination condition comprises processing for a fixed number of generations.

6. The method of claim 4 wherein the termination condition comprises processing until the fitness of a plurality of created solutions increases by less than a predetermined amount.

7. The method of claim 1, wherein at least part of the processing of at least two subpopulations is concurrent in time.

8. The method of claim 1, wherein the contiguous fitness subranges in successive iterations of step b) are chosen such that a probability of a solution in the central pool being included in a contiguous fitness subrange does not depend upon the fitness of the solution.

9. The method of claim 1, wherein the contiguous fitness subranges in successive iterations of step b) are chosen in a round-robin order by fitness rank.

10. The method of claim 1, wherein all solutions in the contiguous subrange of fitness have an equal chance for selection.

11. The method of claim 1, wherein the solutions selected from the contiguous subrange of fitness are chosen randomly.

12. A computer program storage medium comprising encoded software instructions for causing a computer system comprising a central processor and a plurality of peripheral processors, and at least one user interface including at least one input device and at least one output device, to perform the steps of:
   a) receiving by means of at least one of the at least one input devices information concerning an optimization problem,
   b) in response to a communication from one of the plurality of peripheral processors to the central processor, selecting a subpopulation of candidate solutions to the optimization problem from a pool of available candidate solutions, said subpopulation being selected from among a plurality of candidate solutions having fitness values found in a contiguous subrange among fitness values of available candidate solutions in the pool,
   c) processing the subpopulation according to an evolutionary algorithm until a termination condition is reached,
   d) merging the subpopulation whose processing has terminated back into the pool,
   e) repeating said selecting, processing, and merging until an ending condition is reached, and
   f) generating an output signal based upon the candidate solutions in the pool, and providing that output signal including information about at least one candidate solution to the optimization problem to a user by means of at least one of the at least one output devices,
   wherein the central processor maintains the pool, and two or more peripheral processors of heterogeneous capabilities communicatively linked to the central processor process the subpopulations, and
   wherein the contiguous subrange of fitness values from which the selection is made in at least one iteration of step b) does not overlap the contiguous subrange of fitness values from which the selection was made in at least one prior iteration of step b).

13. The medium of claim 12, wherein each subpopulation has the same number of candidate solutions.

14. The medium of claim 12, wherein a size of a subpopulation is selected in dependence on a capability of a processor responsible for processing the said subpopulation.

15. The medium of claim 12 wherein processing a subpopulation according to the evolutionary algorithm comprises one or more generations, each generation comprising:
   selecting a plurality of candidate solutions from the subpopulation based on a fitness of each candidate solution,
   creating a plurality of new candidate solutions by applying evolutionary operators to the selected plurality of solutions, and
   evaluating the fitness of a plurality of the created solutions.

16. The medium of claim 15 wherein the termination condition comprises processing for a fixed number of generations.

17. The medium of claim 15 wherein the termination condition comprises processing until the fitness of a plurality of created solutions increases by less than a predetermined amount.

18. The medium of claim 12, wherein at least part of the processing of at least two subpopulations is concurrent in time.

19. The media of claim 12, wherein the contiguous fitness subranges in successive iterations of step b) are chosen such that a probability of a solution in the central pool being included in a contiguous fitness subrange does not depend upon the fitness of the solution.

20. The media of claim 12, wherein the contiguous fitness subranges in successive iterations of step b) are chosen in a round-robin order by fitness rank.

21. The media of claim 12, wherein all solutions in the contiguous subrange of fitness have an equal chance for selection.

22. The media of claim 12, wherein the solutions selected from the contiguous subrange of fitness are chosen randomly.

23. A computer system comprising:
   at least one user interface including at least one input device and at least one output device,
   a central computer comprising a memory, and
   two or more peripheral computers of heterogeneous capabilities, each comprising a memory,
   the central computer and all peripheral computers being communicatively linked, wherein the central computer memory comprises simultaneously or sequentially one or more programs which cause this computer to perform the steps of:
   a) receiving by means of at least one of the at least one input devices information concerning an optimization problem,
   b) in response to a communication from one of the peripheral computers to the central computer, selecting a subpopulation of candidate solutions to the optimization problem from a pool of available candidate solutions, said subpopulation being selected from among a plurality of candidate solutions having fitness values found in a contiguous subrange among fitness values of available candidate solutions in the pool, and
   c) transmitting this subpopulation to the said peripheral computer,
   d) merging a subpopulation of evolved candidate solutions received from the said peripheral computer back into the pool,
   e) repeating the steps of selecting, transmitting, and merging until an ending condition is reached, and
   f) generating an output signal based upon the candidate solutions in the pool, and providing that output signal including information about at least one candidate solution to the optimization problem to a user by means of at least one of the at least one output devices,
   wherein each peripheral computer memory comprises simultaneously or sequentially one or more programs which cause the said computer to perform the steps of:
   requesting and receiving a subpopulation of candidate solutions from the central computer,
   processing the received subpopulation according to the evolutionary algorithm until a termination condition is reached, and
   returning the processed subpopulation back to the central processor, and
   wherein the contiguous subrange of fitness values from which the selection is made in at least one iteration of step b) does not overlap the contiguous subrange of fitness values from which the selection was made in at least one prior iteration of step b).

24. The system of claim 23, wherein each subpopulation has the same number of candidate solutions.

25. The system of claim 23, wherein a size of a subpopulation is selected in dependence on a capability of a peripheral computer responsible for processing the said subpopulation.

26. The system of claim 23 wherein processing a subpopulation according to the evolutionary algorithm comprises one or more generations, each generation comprising:
   selecting a plurality of candidate solutions from the subpopulation based on a fitness of each candidate solution,
   creating a plurality of new candidate solutions by applying genetic operators to the selected plurality of solutions, and
   evaluating the fitness of a plurality of the created solutions.

27. The system of claim 26 wherein the termination condition comprises processing for a fixed number of generations.

28. The system of claim 26 wherein the termination condition comprises processing until the fitness of a plurality of created solutions increases by less than a predetermined amount.

29. The system of claim 23, wherein at least part of the processing of at least two subpopulations is concurrent in time.

30. The system of claim 23, wherein the contiguous fitness subranges in successive iterations of step b) are chosen such that a probability of a solution in the central pool being included in a contiguous fitness subrange does not depend upon the fitness of the solution.

31. The system of claim 23, wherein the contiguous fitness subranges in successive iterations of step b) are chosen in a round-robin order by fitness rank.

32. The system of claim 23, wherein all solutions in the contiguous subrange of fitness have an equal chance for selection.

33. The system of claim 23, wherein the solutions selected from the contiguous subrange of fitness are chosen randomly.

34. In a computer system comprising a central process and a plurality of peripheral processes, and at least one user interface including at least one input device and at least one output device, a method for generating one or more solutions to an optimization problem, comprising:
   a) receiving by means of at least one of the at least one input devices information concerning the optimization problem,
   b) generating a central pool comprising a population of candidate optimization problem solutions;
   c) associating a fitness with each of the said solutions;
   d) in response to a communication from one of the plurality of peripheral processes to the central process, selecting in the central process a subpopulation of solutions from a collection of solutions forming a contiguous subrange of fitness within the central pool when the selection is made;
   e) performing an evolutionary algorithm in the said peripheral process to generate an evolved subpopulation of solutions from the selected subpopulation of solutions;
   f) merging the evolved subpopulation of solutions into the central pool;
   g) repeating the steps d), e) and f) until a stopping condition is satisfied; and
   h) generating an output signal based upon one or more of the solutions in the central pool, and providing that output signal including information about the one or more solutions to the optimization problem to a user by means of at least one of the at least one output devices;

wherein the central process is resident in a central computer, and a plurality of peripheral processes are resident in a plurality of peripheral computers communicatively connected to the central computer; and wherein the contiguous subrange of fitness from which the selection is made in at least one iteration of step d) does not overlap the contiguous subrange of fitness from which the selection was made in at least one prior iteration of step d).

35. The method of claim 34, wherein at least two peripheral processes are resident in the same peripheral computer.

36. The method of claim 34, wherein at least one peripheral process performs step d) by using idle background resources in the peripheral computer in which it resides.

37. The method of claim 34, wherein at least two of the peripheral processes perform step d) on selected subpopulations of solutions simultaneously.

38. The method of claim 34, wherein a size of the subpopulation selected for the peripheral process is determined by a processing capability of the peripheral process.

39. The method of claim 34, wherein a size of the central pool is determined based upon processing capabilities of the peripheral processes, to reduce a likelihood that a subpopulation of candidate solutions will not he available for a peripheral process.

40. The method of claim 34, wherein the stopping condition is a predetermined number of generations of evolution having occurred.

41. The method of claim 34, wherein the stopping condition is a determination that the fitness of solutions in the evolved subpopulations has increased by less than a predetermined amount.

42. The method of claim 34, wherein performing the evolutionary algorithm in the said peripheral process to generate the evolved subpopulation of solutions from the subpopulation of solutions comprises:
   a) selecting a plurality of solutions from the solutions in the subpopulation, based upon the fitness of each of the said solutions;
   b) generating a plurality of new candidate solutions by evolutionary operations upon the selected plurality of solutions in the subpopulation;
   c) determining a fitness for each generated new candidate solution in the subpopulation; and
   d) repeating steps a), b) and c) for a plurality of generations.

43. The method of claim 34, wherein the contiguous fitness subranges in successive iterations of step d) are chosen such that a probability of a solution in the central pool being included in a contiguous fitness subrange does not depend upon the fitness of the solution.

44. The method of claim 34, wherein the contiguous fitness subranges in successive iterations of step d) are chosen in a round-robin order by fitness rank.

45. The method of claim 34, wherein all solutions in the contiguous subrange of fitness bay an equal chance for selection.

46. The method of claim 34, wherein the solutions selected from the contiguous subrange of fitness are chosen randomly.

47. In a computer system comprising a central processor and a plurality of peripheral processors, and at least one user interface including at least one input device and at least one output device, a method comprising:
   a) receiving by means of at least one of the at least one input devices information concerning an optimization problem,
   b) in response to a communication from one of the plurality of peripheral processors to the central processor, selecting a subpopulation of candidate solutions to the optimization problem from a pool of available candidate solutions, said subpopulation being selected from among a plurality of candidate solutions having fitness values found in a contiguous subrange among fitness values of available candidate solutions in the pool,
   c) processing the subpopulation according to an evolutionary algorithm until a termination condition is reached,
   d) merging the subpopulation whose processing has terminated back into the pool,
   e) repeating said selecting, processing, and merging until an ending condition is reached, and
   f) generating an output signal based upon the candidate solutions in the pool, and providing that output signal including information about at least one candidate solution to the optimization problem to a user by means of at least one of the at least one output devices, and
   wherein the central processor maintains the pool, and two or more peripheral processors of heterogeneous capabilities communicatively linked to the central processor process the subpopulations, and,
   wherein in at least one iteration of step b), the contiguous subrange of fitness values does not include the highest fitness values.

48. A computer program storage medium comprising encoded software instructions for causing a computer system comprising a central processor and a plurality of peripheral processors, and at least one user interface including at least one input device and at least one output device, to perform the steps of:
   a) receiving by means of at least one of the at least one input devices information concerning an optimization problem,
   b) in response to a communication from one of the plurality of peripheral processors to the central processor, selecting a subpopulation of candidate solutions to the optimization problem from a pool of available candidate solutions, said subpopulation being selected from among a plurality of candidate solutions having fitness values found in a contiguous subrange among fitness values of available candidate solutions in the pool,
   c) processing the subpopulation according to an evolutionary algorithm until a termination condition is reached,
   d) merging the subpopulation whose processing has terminated back into the pool,
   e) repeating said selecting, processing, and merging until an ending condition is reached, and
   f) generating an output signal based upon the candidate solutions in the pool and providing that output signal including information about at least one candidate solution to the optimization problem to a user by means of at least one of the at least one output devices, and
   wherein the central processor maintains the pool, and two or more peripheral processors of heterogeneous capabilities communicatively linked to the central processor process the subpopulations, and,
   wherein in at least one iteration of step b), the contiguous subrange of fitness values does not include the highest fitness values.

49. A computer system comprising:
   at least one user interface including at least one input device and at least one output device,
   a central computer comprising a memory, and
   two or more peripheral computers of heterogeneous capabilities, each comprising a memory, the central computer and all peripheral computers being communicatively linked, wherein the central computer memory comprises simultaneously or sequentially one or more programs which cause this computer to perform the steps of:

a) receiving by means of at least one of the at least one input devices information concerning an optimization problem, b) in response to a communication from one of the peripheral computers to the central computer, selecting a subpopulation of candidate solutions to the optimization problem from a pool of available candidate solutions, said subpopulation being selected from among a plurality of candidate solutions having fitness values found in a contiguous subrange among fitness values of available candidate solutions in the pool, and c) transmitting this subpopulation to the said peripheral computer, d) merging a subpopulation of evolved candidate solutions received from the said peripheral computer back into the pool, e) repeating the steps of selecting, transmitting, and merging until an ending condition is reached, and f) generating an output signal based upon the candidate solutions in the pool, and providing that output signal including information about at least one candidate solution to the optimization problem to a user by means of at least one of the at least one output devices, and wherein each peripheral computer memory comprises simultaneously or sequentially one or more programs which cause the said computer to perform the steps of:

requesting and receiving a subpopulation of candidate solutions from the central computer, processing the received subpopulation according to the evolutionary algorithm until a termination condition is reached, and returning the processed subpopulation back to the central processor, and, wherein in at least one iteration of step b), the contiguous subrange of fitness values does not include the highest fitness values.

50. In a computer system comprising a central process and a plurality of peripheral processes, and at least one user interface including at least one input device and at least one output device, a method for generating one or more solutions to an optimization problem, comprising:

a) receiving by means of at least one of the at least one input devices information concerning the optimization problem, b) generating a central pool comprising a population of candidate optimization problem solutions;

c) associating a fitness with each of the said solutions;

d) in response to a communication from one of the plurality of peripheral processes to the central process, selecting in the central process a subpopulation of solutions from a collection of solutions forming a contiguous subrange of fitness within the central pool when the selection is made;

e) performing an evolutionary algorithm in the said peripheral process to generate an evolved subpopulation of solutions from the selected subpopulation of solutions;

f) merging the evolved subpopulation of solutions into the central pool;

g) repeating the steps d), e) and f) until a stopping condition is satisfied; and h) generating an output signal based upon one or more of the solutions in the central pool, and providing that output signal including information about the one or more solutions to the optimization problem to a user by means of at least one of the at least one output devices; and wherein the central process is resident in a central computer, and a plurality of peripheral processes are resident in a plurality of peripheral computers communicatively connected to the central computer, and, wherein in at least one iteration of step d), the contiguous subrange of fitness does not include the highest fitness values.

* * * * *